(12) United States Patent
Katagishi et al.

(10) Patent No.: US 7,362,952 B2
(45) Date of Patent: Apr. 22, 2008

(54) PERSONAL DIGITAL ASSISTANT APPARATUS

(75) Inventors: Makoto Katagishi, Chigasaki (JP);
Yutaka Matsunobu, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 735 days.

(21) Appl. No.: 10/892,907

(22) Filed: Jul. 15, 2004

(65) Prior Publication Data
US 2005/0229223 A1 Oct. 13, 2005

(30) Foreign Application Priority Data
Mar. 30, 2004 (JP) ............................. 2004-100170

(51) Int. Cl.
*G06F 13/00* (2006.01)
*H04N 5/91* (2006.01)

(52) U.S. Cl. .................. 386/83; 455/3.06; 455/3.04; 725/46; 345/169

(58) Field of Classification Search .......... 386/46, 386/83; 455/3.01–3.06; 725/46, 91
See application file for complete search history.

(56) References Cited

U.S. PATENT DOCUMENTS

| | | | |
|---|---|---|---|
| 5,214,622 A | 5/1993 | Nemoto et al. | |
| 5,801,747 A | 9/1998 | Bedard | |
| 6,771,886 B1* | 8/2004 | Mendelsohn | 386/83 |
| 7,088,952 B1* | 8/2006 | Saito et al. | 455/3.06 |
| 7,095,402 B2* | 8/2006 | Kunii et al. | 345/169 |
| 7,197,495 B2* | 3/2007 | Deguchi et al. | 707/3 |
| 7,200,611 B2* | 4/2007 | Potrebic et al. | 707/104.1 |
| 2001/0021884 A1 | 9/2001 | Shinyagaito | |
| 2002/0010868 A1* | 1/2002 | Nakashima et al. | 713/201 |
| 2003/0033603 A1* | 2/2003 | Mori et al. | 725/46 |
| 2004/0052504 A1 | 3/2004 | Yamada et al. | |
| 2004/0107447 A1 | 6/2004 | Katagishi et al. | |
| 2005/0042983 A1* | 2/2005 | Borgward | 455/3.06 |

FOREIGN PATENT DOCUMENTS

| | | |
|---|---|---|
| JP | 04-227380 | 8/1992 |
| JP | 07-131724 A | 5/1995 |
| JP | 08-19063 A | 1/1996 |
| JP | 09-102827 A | 4/1997 |
| JP | 11-274896 A | 10/1999 |
| JP | 2000-41211 A | 2/2000 |
| JP | 2001-275072 A | 10/2001 |

(Continued)

*Primary Examiner*—Thai Q. Tran
*Assistant Examiner*—Mishawn Dunn
(74) *Attorney, Agent, or Firm*—Townsend and Townsend and Crew LLP

(57) ABSTRACT

A personal digital assistant (PDA) apparatus and a recording and reproduction apparatus improved in convenience in use by reflecting the viewing situation in the PDA into the recording and reproduction apparatus are provided. The PDA includes a reception unit for perceiving a broadcast signal including program information, a communication unit for communicating with the recording and reproduction apparatus, which records/reproduces a broadcast signal, a display unit for displaying the program information and video information included in the broadcast signal, a storage unit for storing viewing history of a received and displayed video signal, and an operation unit for operating viewing in the apparatus. Based on viewing history stored in the storage unit, an order signal is sent to the recording and reproduction apparatus via the communication unit to order reproduction of information relating to the viewing history from among information stored in the recording and reproduction apparatus.

17 Claims, 14 Drawing Sheets

FOREIGN PATENT DOCUMENTS

| | | |
|---|---|---|
| JP | 2001-326866 A | 11/2001 |
| JP | 2002-057953 | 2/2002 |
| JP | 2002-64769 A | 2/2002 |
| JP | 2002-77839 A | 3/2002 |
| JP | 2002-152618 A | 5/2002 |
| JP | 2003-87208 A | 3/2003 |
| JP | 2003-110955 A | 4/2003 |
| JP | 2003-209523 A | 7/2003 |
| JP | 2003-209759 | 7/2003 |
| JP | 2003-259267 A | 9/2003 |
| JP | 2003-304477 | 10/2003 |
| JP | 2003-324675 A | 11/2003 |
| JP | 2003-348510 | 12/2003 |
| JP | 2004-048251 | 2/2004 |
| JP | 2004-72486 A | 3/2004 |
| JP | 2004-193973 A | 7/2004 |
| WO | WO 98/1877 | 5/1998 |

* cited by examiner

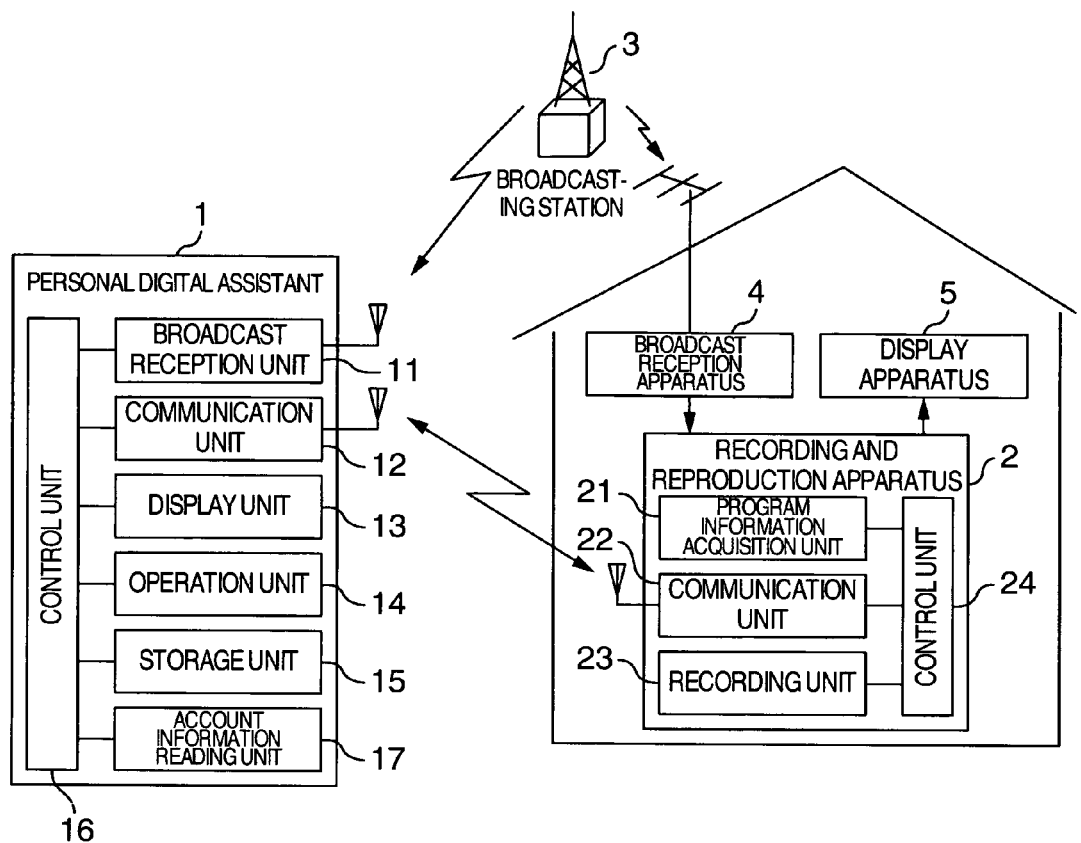
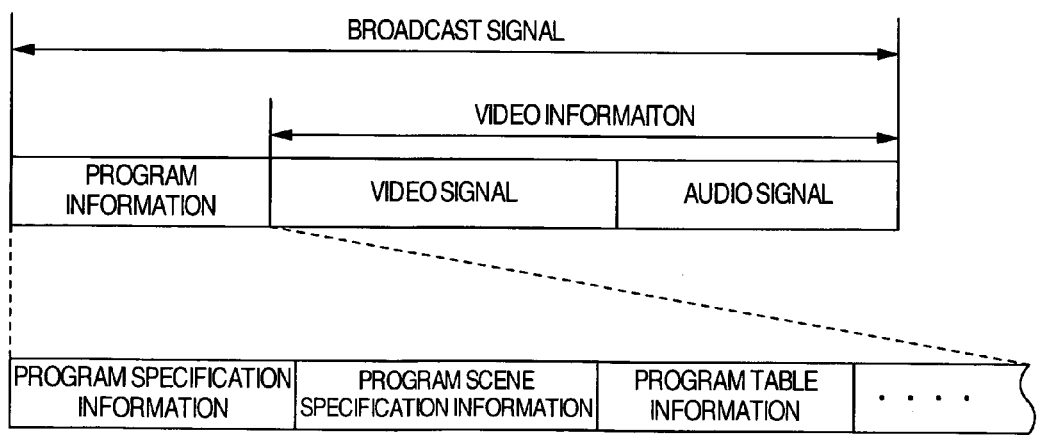

FIG.4
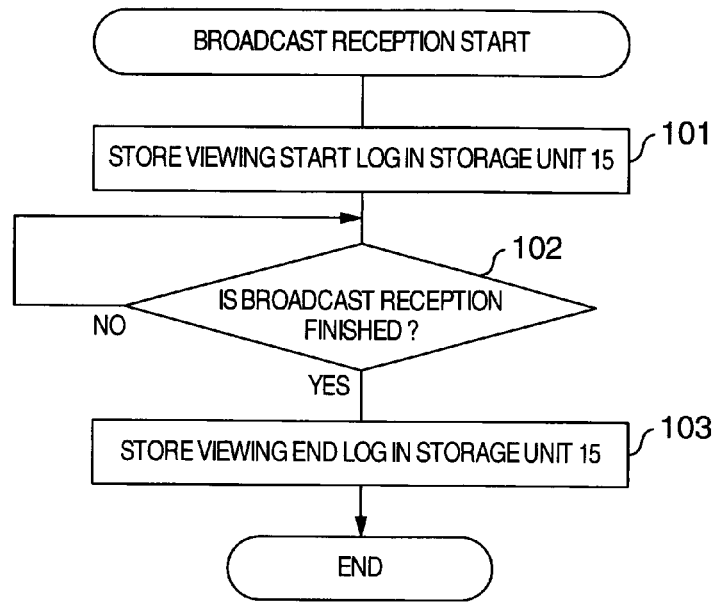
FIG.5
| CHANNEL | VIEWING START TIME | VIEWING END TIME | PROGRAM INFORMATION | ... |
|---|---|---|---|---|
| x x | YY:YY | ZZ:ZZ | PROFRAM NAME, ... | |
| ... | | | | |
FIG.6
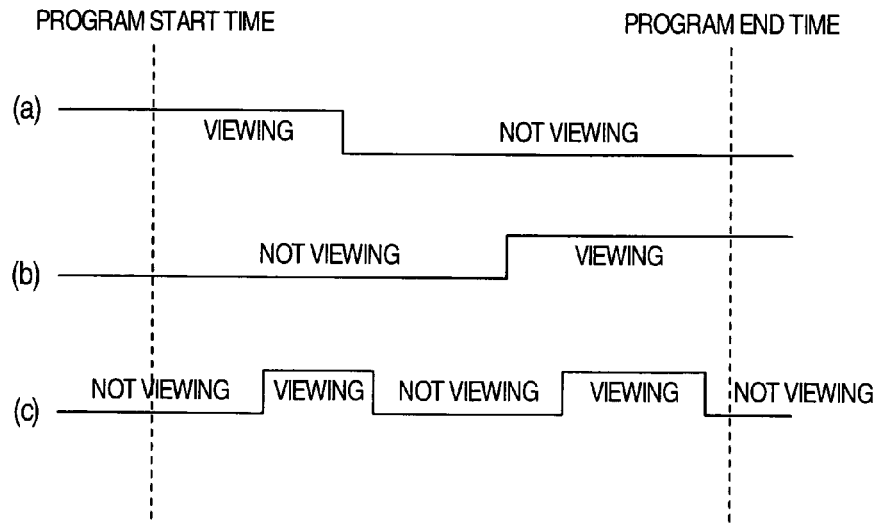

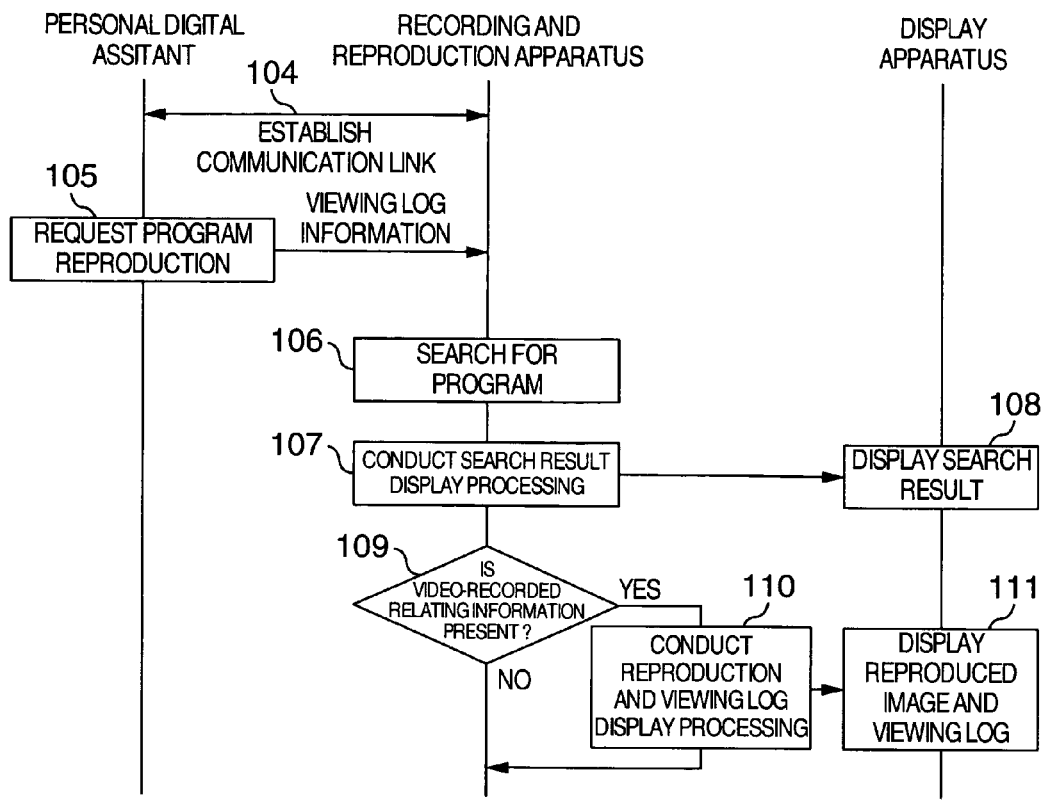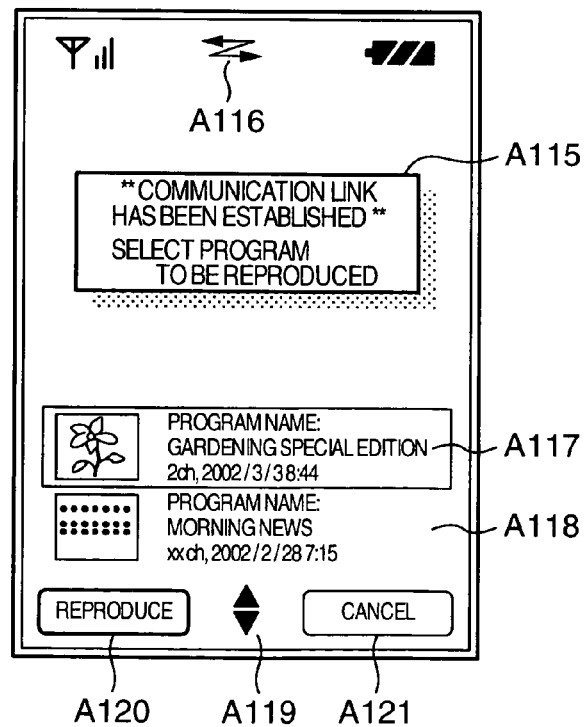

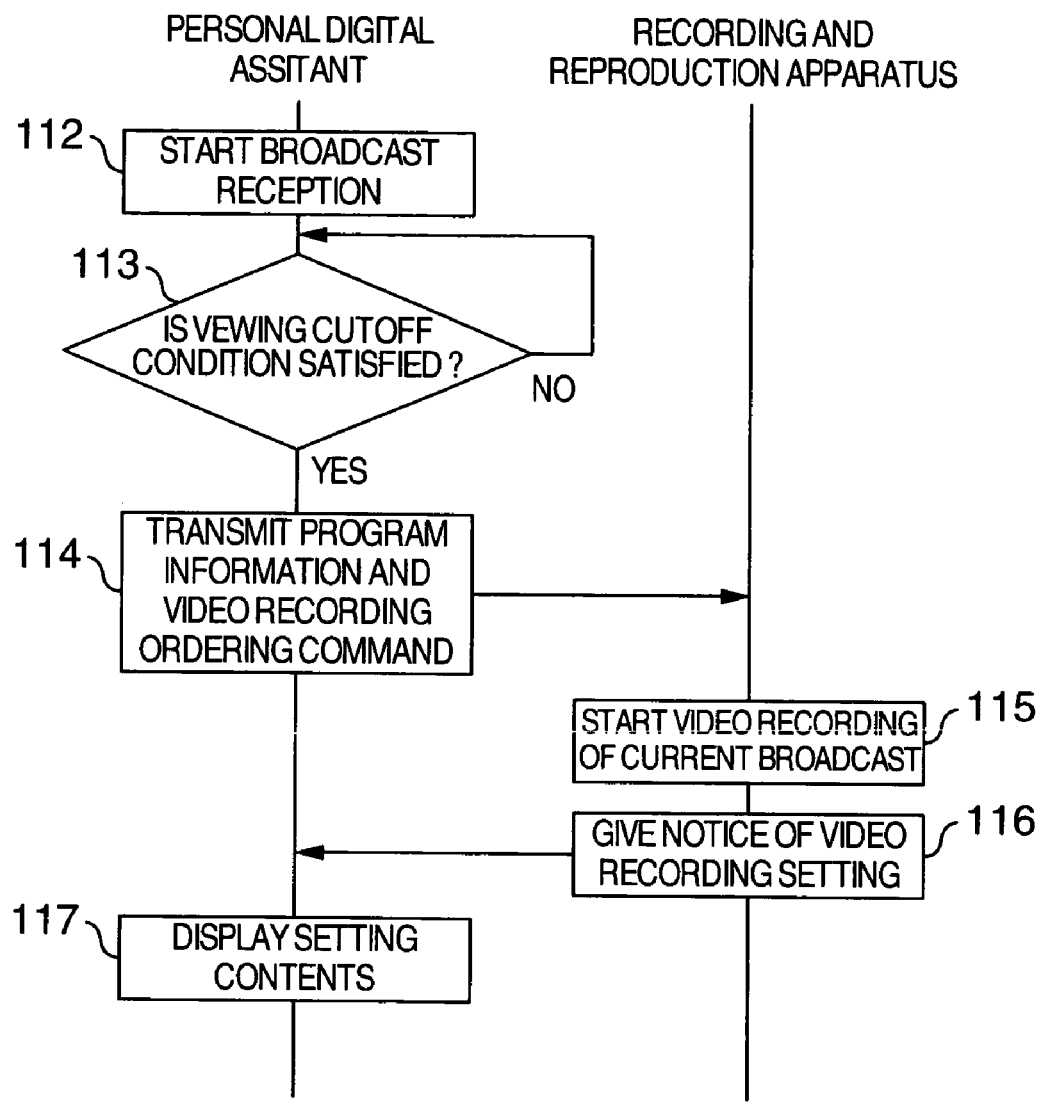

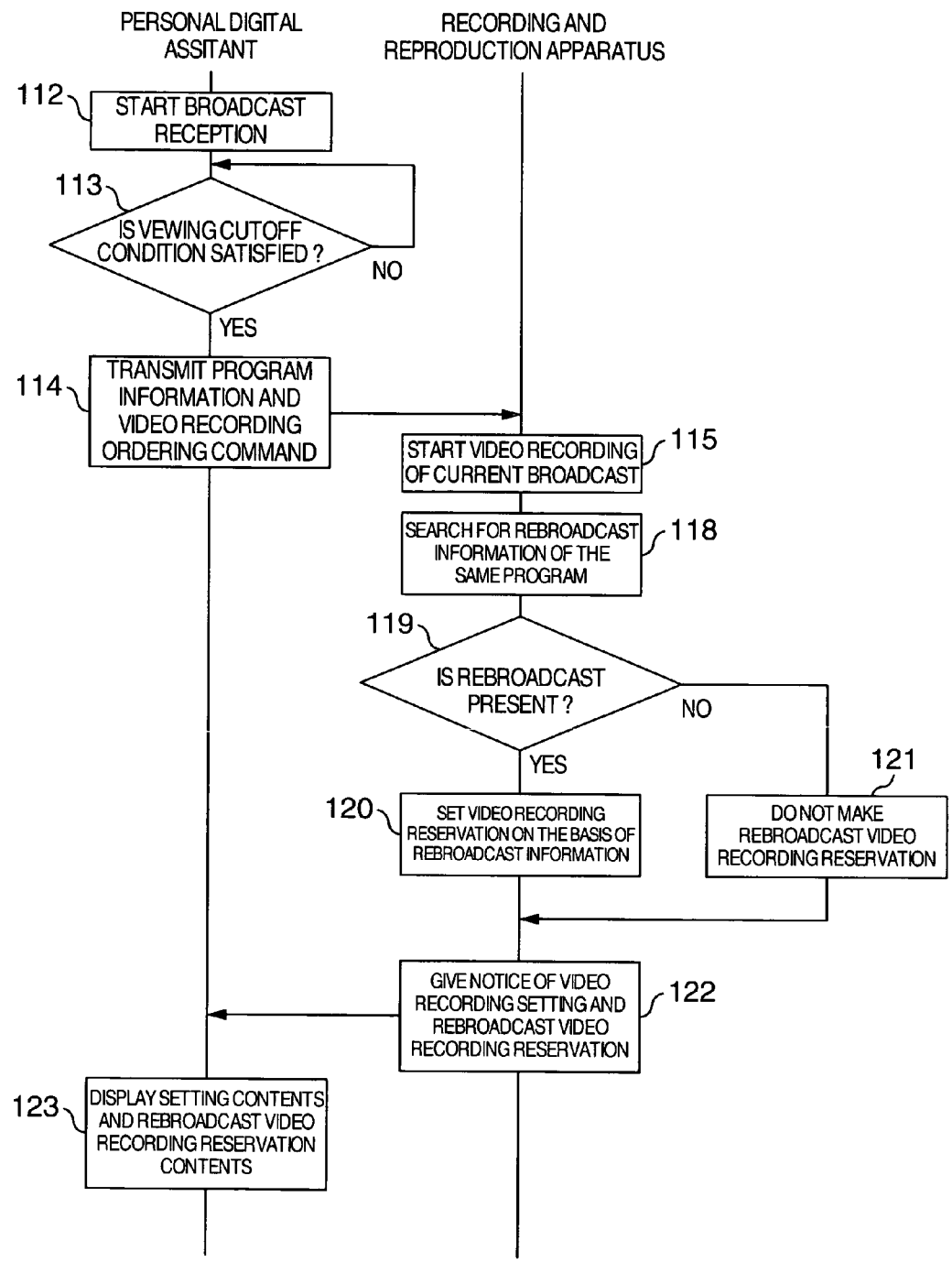

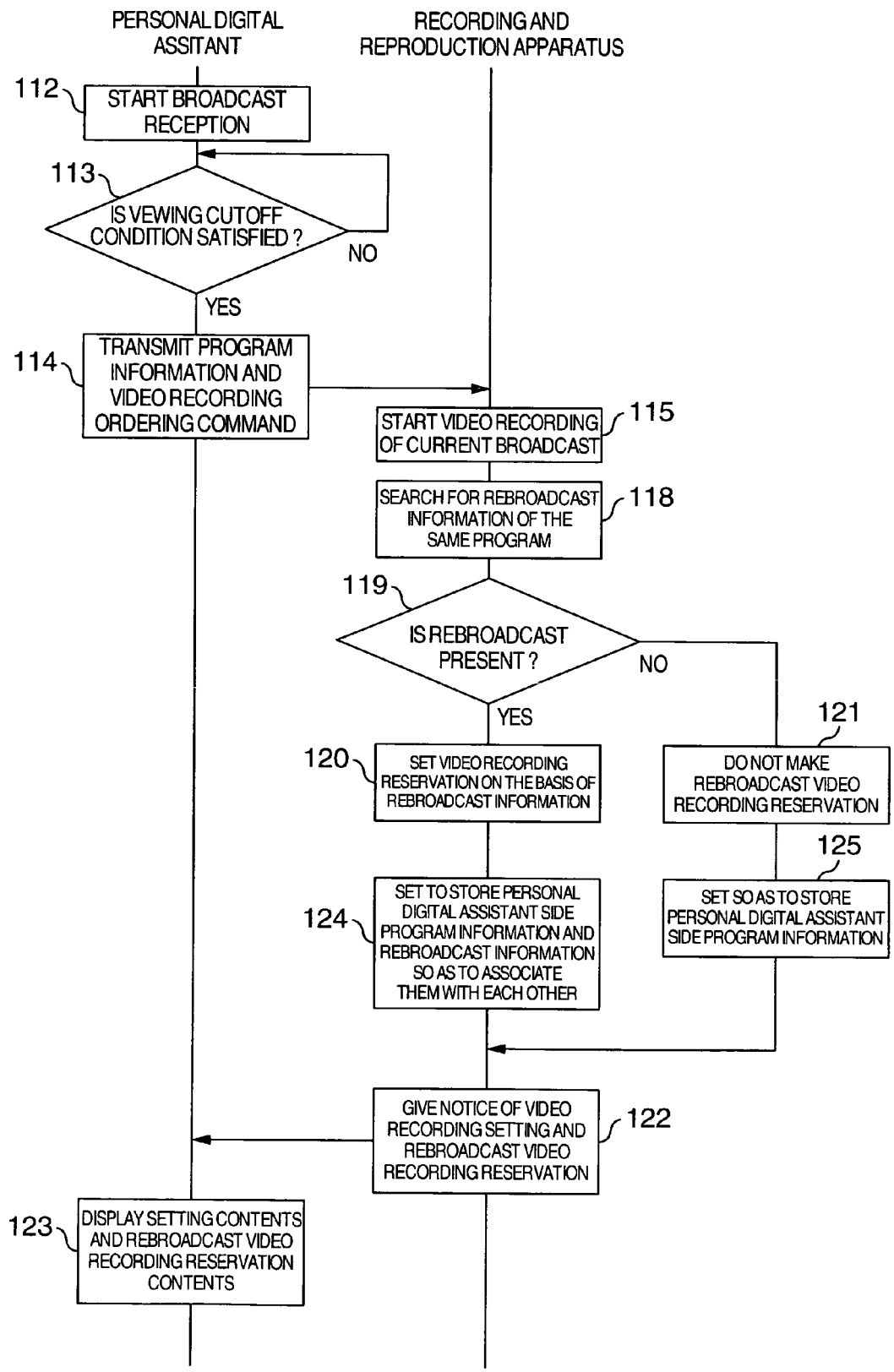

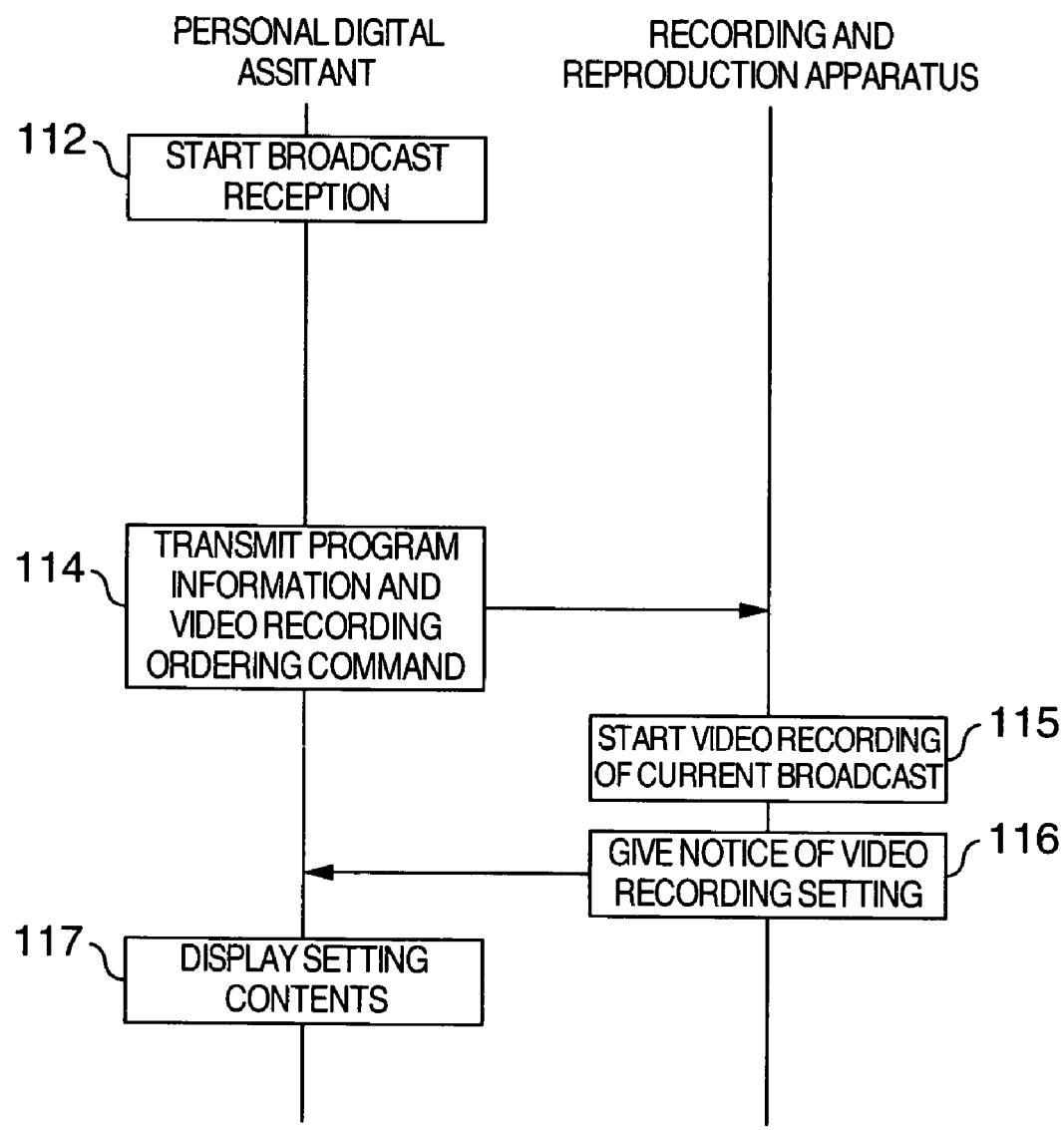

PERSONAL DIGITAL ASSISTANT APPARATUS

BACKGROUND OF THE INVENTION

The present invention relates to a personal digital assistant (PDA) apparatus or a portable information terminal apparatus and a recording and reproduction apparatus. In particular, the present invention relates to a personal digital assistant apparatus or a portable information terminal apparatus used by the user to listen to information and a recording and reproduction apparatus that can communicate with the personal digital assistant apparatus.

For example, in JP-A-2003-348510, a mobile terminal having a video recording and reproduction function capable of recording broadcast contents even during talking and later reproducing the recorded contents in the mobile terminal is disclosed.

In JP-A-2002-57953, a remote setting system in a television broadcast receiver capable of conducting various kinds of setting in the television broadcast receiver installed in one's house by using a terminal in a remote place is disclosed.

In JP-A-2003-304477, a video and audio reproducer capable of automatically reproducing a continuation of the same program even in a device other than a device (PDA) that is currently reproducing contents by delivering a memory card having history information recorded thereon from the PDA to an HDD recording and reproduction apparatus is disclosed.

Typically, in the case where a TV (television) broadcast is viewed, the user's taste for viewing differs depending upon whether a personal digital assistant apparatus is used or a TV receiver or a video recording and reproducing apparatus installed in one's own home is used. For example, when viewing a program on a personal digital assistant apparatus while one is out, there is a limit in size of a display screen because of a casing size determined by considering the portability, and consequently promptly reporting programs such as news and sports relay broadcasts are viewed rather than detailed forceful programs in many cases. On the other hand, as for viewing using an indoor TV receiver or video recording and reproduction apparatus, there is no limit in screen size and there is a degree of freedom in installation, and consequently clear forceful images and voices are enjoyed on a large screen in many cases.

Spread of TV broadcast viewing using a personal digital assistant causes a desire to view a program one viewed while being out, again on a large screen after coming home, or a desire to view a part of a program during spare time while one is out and view a continuation of the program, parts located before and after the viewed part, or the whole program by using an indoor video recording and reproduction apparatus after coming home.

By the way, in general, the situation of viewing conducted by using a personal digital assistant is not reflected in a TV receiver or a video recording and reproduction apparatus installed indoors (in one's house). As for information as to how far one viewed a program, i.e., from which scene in the program one desires to view, therefore, the user must rely on the user's own memory.

In JP-A-2003-348510 and JP-A-2002-57953, a method of viewing and conducting video recording and reproducing by using a mobile terminal alone is shown. However, a technique for improving the convenience in use in cooperation with an external device such as a video recording and reproducing apparatus is not disclosed. A terminal for conducting remote control on video recording setting in the video recording and reproduction apparatus and setting alteration in a TV receiver is described. However, convenience in use in the case where a TV broadcast or the like is received by a terminal is not described.

In JP-A-2003-304477, delivery of the viewing history conducted via a memory card is described. In operating a video and voice reproducer, however, an operation section of the video and voice reproducer must be used. In other words, it is demanded to become skillful in operation of devices of two kinds (PDA and video recording and reproduction apparatus). Therefore, improvement of the convenience in use cannot be anticipated.

SUMMARY OF THE INVENTION

The present invention has been achieved in order to solve these problems.

An object of the present invention is to provide a personal digital assistant apparatus and a video recording and reproduction apparatus improved in convenience in use by reflecting the situation of viewing conducted by means of the personal digital assistant apparatus into operation of the video recording and reproduction apparatus.

In order to achieve the object, a personal digital assistant apparatus according to the present invention includes a reception unit for perceiving a broadcast signal including program information, a communication unit for conducting communication with a recording and reproduction apparatus, which records and reproduces a broadcast signal, a display unit for displaying the program information and video information included in the broadcast signal, a storage unit for storing a viewing history of a received and displayed video signal, and an operation unit for operating viewing in the apparatus. On the basis of a viewing history stored in the storage unit, the personal digital assistant apparatus sends an order signal to the recording and reproduction apparatus via the communication unit to order recording or reproduction of information relating to the viewing history.

Owing to the configuration, the present invention can provide a personal digital assistant apparatus and a video recording and reproduction apparatus improved in convenience in use.

Other objects, features and advantages of the invention will become apparent from the following description of the embodiments of the invention taken in conjunction with the accompanying drawings.

BRIEF DESCRIPTION OF THE DRAWINGS

FIG. 1 is a diagram showing a recording and reproduction system according to a first embodiment of the present invention;

FIG. 2 is a diagram showing details of a broadcast signal;

FIG. 4 is a diagram showing a recording method of a viewing log in a personal digital assistant apparatus;

FIG. 5 is a diagram showing details of a viewing log;

FIG. 6 is a diagram showing a program viewing form of a user;

FIG. 7 is a diagram showing processing for reproducing a program recorded in a recording and reproducing apparatus by using a viewing log;

FIG. 8 is a diagram showing a display example on a display section in a personal digital assistant apparatus;

FIG. 10 is a diagram showing a video recording order of a program issued to a recording and reproduction apparatus by a personal digital assistant apparatus;

FIG. 11 is a diagram showing a third embodiment of the present invention;

FIG. 12 is a diagram showing a fourth embodiment of the present invention;

FIG. 13 is a diagram showing a fifth embodiment of the present invention;

DESCRIPTION OF THE EMBODIMENTS

Figure 3A:
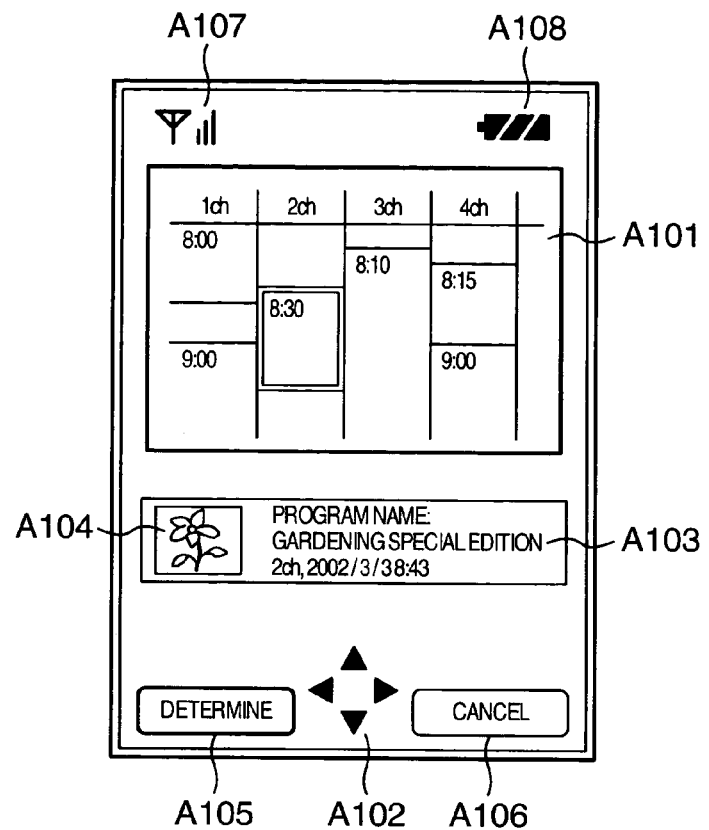
FIGS. 3A and 3B are diagrams showing examples of display information displayed in a display unit of a personal digital assistant apparatus when starting viewing.

Hereafter, preferred embodiments of the present invention will be described with reference to the accompanying drawings. FIG. 1 is a diagram showing a recording and reproduction system according to a first embodiment of the present invention. When a TV broadcast is viewed on a personal digital assistant apparatus or a portable information terminal apparatus, viewing history is stored in the personal digital assistant apparatus. In addition, the stored history information is transmitted to a recording and reproduction apparatus to control the recording and reproduction apparatus. A reproduced signal in the recording and reproduction apparatus is displayed. In this way, viewing convenience is improved in this example. By the way, in ensuing drawings, a like reference character denotes the same component or the same step.

In FIG. 1, numeral 1 denotes a personal digital assistant or a portable information terminal apparatus having a function of receiving a TV broadcast. Numeral 2 denotes a recording and reproduction apparatus having a function of receiving a TV broadcast including program information. Numeral 3 denotes a broadcasting station for broadcasting a TV signal.

The personal digital assistant 1 includes a broadcast reception unit 11 for receiving a broadcast signal broadcasted by the broadcasting station 3, a communication unit 12 for communicating with an external device, a display unit 13 for displaying broadcast contents, an operation unit 14 operated by the user, a storage unit 15 for storing various data, and a control unit 16 for controlling these components. When receiving a TV broadcast, a broadcast signal received by using the broadcast reception unit 11 is displayed on the display unit 13 by the control unit 16. Numeral 17 denotes an account information reading unit for reading account information stored in an account card or the like. The account information reading unit 17 has a slot for inserting the account card therein.

When receiving a charged broadcast, an account card (for example, B-CAS (registered trademark)) or the like is inserted into a slot for account card in the personal digital assistant 1. Deciphering and accounting for the broadcast signal can be conducted on the basis of information stored on the card. Furthermore, by operating the recording and reproduction apparatus 2 by using the personal digital assistant 1 having the account card inserted therein, a signal recorded in the recording and reproduction apparatus 2 can be deciphered and reproduced. The amount of account money can be varied according to whether reproduction is conducted by the personal digital assistant (reproduction on a small screen) or conducted by the recording and reproduction apparatus 2 (reproduction on a large screen). When operating the recording and reproduction apparatus 2 by using the personal digital assistant 1 having the account card inserted therein, it is desirable to be able to decipher the recorded signal even if the card is not inserted into the recording and reproduction apparatus 2.

FIG. 2 is a diagram showing details of a broadcast signal. As shown in FIG. 2, the broadcast signal includes video information (video signal and audio signal) and program information added to the video information. The program information is information concerning a program to be broadcasted. For example, the program information is information for specifying a program (program specification information), information for specifying a scene of a program (program scene specification information), program table information for representing scheduled programs of respective channels in a table form, or information obtained by combining them.

The program specification information is information, for example, such as a program ID, a program title name, a broadcast channel name, a broadcasting time zone, performers or program contents. The program specification information may be any information as long as it can specify a program. The program scene specification information is, for example, the time elapsed from the program start. If video information is divided into sections, the program scene specification information is a section number. The program scene specification information may be any information as long as it can specify one scene in the program.

In FIG. 1, the recording and reproduction apparatus 2 includes a recording unit 23 for recording a broadcast signal input from a broadcast reception apparatus 4, a program information acquisition unit 21 for acquiring program information, a communication unit 22 for communicating with an external device, and a control unit 24 for controlling them.

The broadcast signal recorded in the recording unit 23 is transmitted to a display apparatus 5 via the control unit 24, and displayed on the display unit 5. The communication units 12 and 22 are provided to conduct communication between the personal digital assistant 1 and the recording and reproduction apparatus 2 directly or via a network. The communication units 12 and 22 may be, for example, devices that can be wireless-connected directly to an external device, such as infrared ray communication ports or wireless LAN systems (ARIB (Incorporated Association, Radio Wave Industry Association) STD-T66). Each of the communication units 12 and 22 may also be a mobile telephone connected to a line network via a base station. As a result, information exchange becomes possible without wired connection between devices, and the degree of freedom in utilization place can be increased.

Figure 3B:
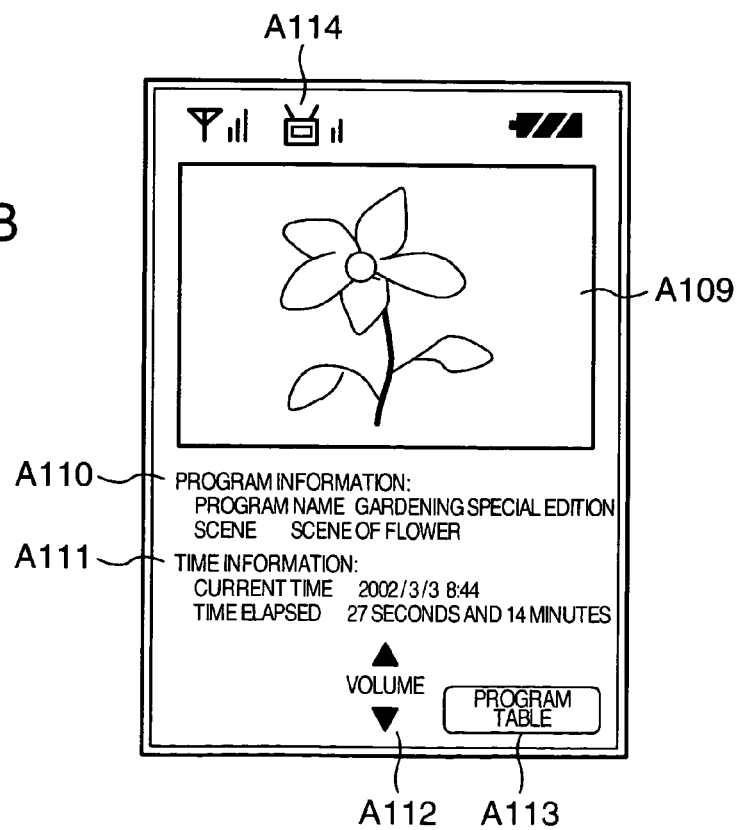

FIGS. 3A and 3B are diagrams showing example of display information displayed on the display unit 13 in the personal digital assistant 1 when viewing is started. FIG. 3A shows a display example appearing at the time of selection of a broadcast program. FIG. 3B shows a display example appearing after a broadcast program has been selected.

In FIG. 3A, A101 denotes video information obtained by displaying information of programs that can be viewed, such as a program table, on the display unit 13. A program frame within the program table is selected by operating up, down, left and right cursors (A102) on the operation unit 15. As shown in A103, a broadcast channel, a program name, date and so on of the selected program may be displayed. Furthermore, as shown in A204, a program view acquired from the broadcast reception unit 11 may be reduced, and a part of a program view may also be displayed together. In this case, program contents can be discriminated simply.

If a "Determine" button A105 on the operation unit A105 is operated in a state in which an arbitrary program has been selected, then the selected program is displayed on the display unit as shown in FIG. 3B. By the way, the channel and program selection method is not limited to this. For example, a channel number may also be input directly from the operation unit 15 in the same way as an ordinary TV receiver, or a channel number alteration order may be issued from the operation unit 15. In the case where false operation has been conducted, a "cancel" button A106 on the operation unit 15 may be operated to cancel the operation conducted immediately before.

Furthermore, as means for giving notice of the operation situation in the personal digital assistant 1, it is possible to display the received radio wave strength in the communication unit 12 as represented by A107 or display the residual quantity in the battery as represented by A108. Not only the reception state of the communication unit 12 is displayed as represented by A107, but also the radio wave strength may be displayed in the case where the personal digital assistant 1 has a communication function of a mobile telephone.

After a broadcast program is selected and a shift to the view shown in FIG. 3B is conducted, contents of the selected program (or broadcast channel) are displayed as represented by A109. At this time, program information such as the program name and scene, and information such as the current time or the time elapsed from the program start may also be displayed as represented by A110 and A112. Furthermore, an operation guide to the effect that the volume is adjustable in the operation unit 15 may be displayed as represented by A112, and an operation guide to the effect that a shift to a view of a program table is possible may be displayed as represented by A113.

FIG. 4 is a diagram showing a recording method of a viewing log in the personal digital assistant 1. First, upon accepting a broadcast reception start order input generated by operating the operation unit 14, the control unit 16 receives broadcast contents by using the broadcast reception unit 11, and displays the received contents on the display unit 13. The control unit 16 extracts program information from the received signal, creates a viewing start log by using the extracted program information, and stores the created viewing start log in the storage unit 15 (step 101). Subsequently, upon accepting a broadcast reception end order input generated by operating the operation unit 14, the control unit 16 stops the broadcast reception using the broadcast reception unit 11 (step 102). When the broadcast reception has been finished, the control unit 16 creates a viewing end log by using the program information received until then, and stores the created viewing end log I the storage unit 15 (step 103).

FIG. 5 is a diagram showing details of a viewing log. As shown in FIG. 5, the viewing log stored in the storage unit 15 includes, for example, a broadcast channel under reception, viewing start time, and viewing end time. Furthermore, by storing the program information together, reproduction request processing on the recording and reproduction apparatus 2 described later becomes possible. By the way, the above-described viewing log can be recorded every viewed channel or every viewing (from viewing start time to viewing end time).

FIG. 6 is a diagram showing a program viewing form of the user. The user's viewing forms are diversified. For example, there are a case where the user starts viewing before a program starts and suspends the viewing in the middle of the program (FIG. 6(a)), a case where the viewer starts viewing in the middle of a program (FIG. 6(b)), and a case where the viewer interrupts viewing in the middle of a program (FIG. 6(c)).

The viewing log may be created by storing a viewing start log simultaneously with the viewing start and generating and storing a viewing end log simultaneously with the viewing end. In this case, the viewing log creation can be executed by the processing shown in FIG. 4.

Furthermore, if viewing is interrupted during a program and viewing time is shorter than a predetermined value (for example, in the case where the user searches for a program the user desires to view while changing the broadcast channel) as shown in FIG. 6(c), control may be exercised so as to prevent its storage in a viewing log. In this case, information that is not necessary for the viewing log can be excluded. As a result, the amount used in the storage unit 15 is reduced and the convenience in use at the time when the user utilizes the viewing log is improved.

FIG. 7 is a diagram showing processing for reproducing a program recorded in the recording and reproducing apparatus by using the viewing log. With reference to FIG. 7, operation for using a viewing log stored in the personal digital assistant 1 to display a program related to the viewing log and included in programs recorded in the recording and reproduction apparatus 2 on the display apparatus 5 connected to the recording and reproduction apparatus 2.

It is now supposed that the user of the personal digital assistant 1 is present near the recording and reproduction apparatus 2 and operates the personal digital assistant 1. Upon an input to the operation unit 14 in the personal digital assistant 1 from the user, the communication unit 12 in the personal digital assistant 1 establishes a communication link with the communication unit 22 in the recording and reproduction apparatus 2. After the communication link has been established, the communication unit 12 in the personal digital assistant 1 sends the viewing log stored in the storage unit 15 in the personal digital assistant 1 to the recording and reproduction apparatus 2 automatically or in response to specific operation (step 105).

The recording unit 23 in the recording and reproduction apparatus 2 records a broadcast signal (program information, a video signal and an audio signal) received by the broadcast reception apparatus 4 previously according to the user's taste. Upon receiving the viewing log from the personal digital assistant 1, the recording and reproduction apparatus 2 compares program information included in the received viewing log with the program information stored in the recording unit 23 (step 106), makes a search to determine whether video-recorded information (such as a program, a part of a program, or a scene in a program) relating to the received viewing log is present, and displays its result on the display apparatus 5 (step 108). If it is found as a result of the search that video-recorded relating information is present, then the recording and reproduction apparatus 2 conducts processing to reproduce the video-recorded information obtained by the search (steps 110 and 111). If video-recorded information is not present as a result of the search, then the reproduction processing is not conducted. By the way, the viewing log used for the search can be displayed in reproducing the video-recorded information.

FIG. 8 is a diagram showing a display example on the display section 13 in the personal digital assistant 1. An example displayed when selecting a reproduction subject after a communication link between the personal digital assistant 1 and the recording and reproduction apparatus 2 is established is shown (it corresponds to the display in the step 105 shown in FIG. 7).

In the example shown in FIG. 8, it is indicated by a message or a figure as represented by A115 or A116 that the communication link has been established, so as to make possible visual ascertainment. Furthermore, a reproduction subject is selected by operating scroll buttons A119 on the operation unit 14. If the display contents on the operation view at the time when viewing is started on the personal digital assistant 1 are maintained as represented, for example, by A117 and A118, then the user can make a decision quickly and accurately when selecting the reproduction subject. If a "Reproduce" button A120 on the operation unit 14 is pressed, then the selected program information is transmitted to the recording and reproduction apparatus 2.

Owing to the processing heretofore described, for example, program information of a program viewed by the user during spare time in movement can be recorded in the personal digital assistant 1 as the viewing log, and after coming home, the user can search programs stored in the recording and reproduction apparatus 2 installed indoors for information relating to the viewing log, and reproduce the information. At this time, it is not necessary for the user to purposely search a large number of programs stored in the recording and reproduction apparatus 2 for a pertinent program. It is possible to search for and view a desired program by conducting simple operation of operating the scroll buttons A119 and thereby selecting a reproduction subject from among displayed search results. As a result, the convenience in use is improved.

Figure 9A:
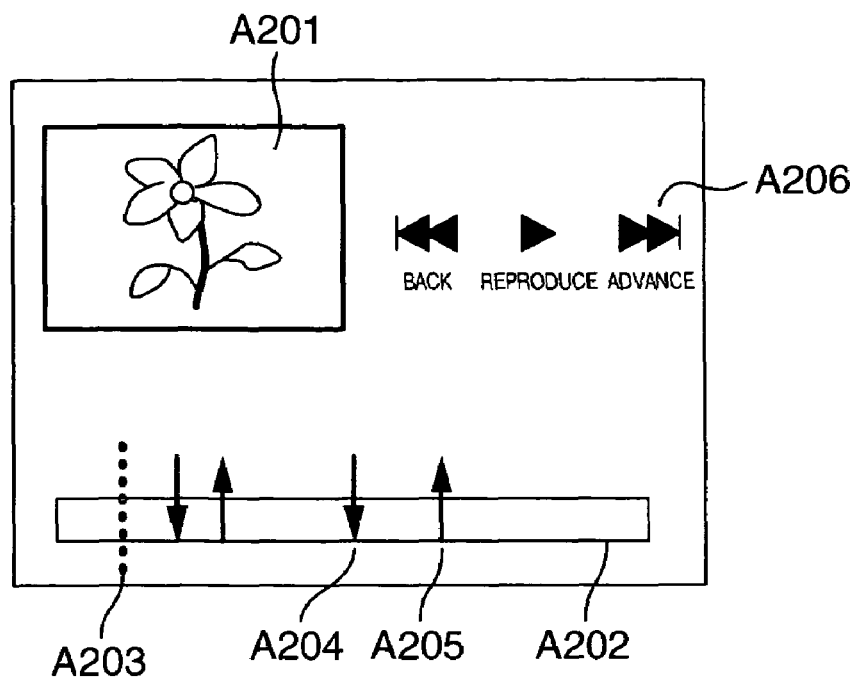
FIGS. 9A and 9B are diagrams showing display examples on a display apparatus obtained on the basis of an output of a recording and reproduction apparatus.
Figure 9B:
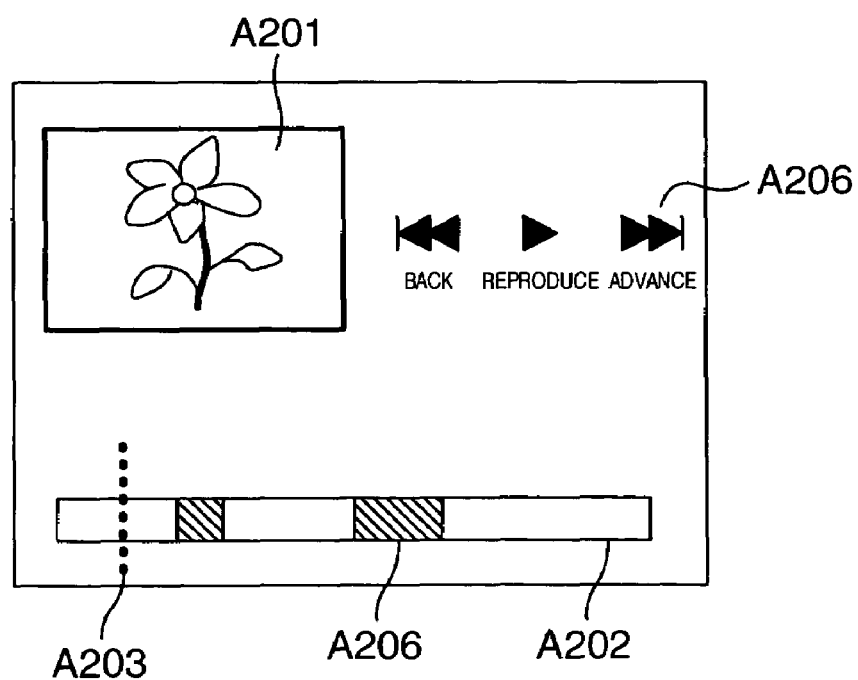

FIGS. 9A and 9B show display examples on a display apparatus obtained on the basis of an output of a recording and reproduction apparatus. The control unit 24 in the recording and reproduction apparatus 2 receives viewing log information sent from the personal digital assistant 1, via the communication unit 22. Upon judging that a video-recorded program relating to the viewing log is present in previously video-recorded information, the control unit 24 reproduces the program and displays the viewing log of the personal digital assistant 1 (111 in FIG. 7).

In the example shown in FIG. 9A, a video-recorded program (A201), a time frame of the program (A202), information representing the current reproduced scene (A203) and the viewing log information (A204 and A205) are displayed on the display apparatus 5. The viewing log information is displayed so as to be superposed on the time frame A202, which represents the time ranging from the start of the program to the end of the program, by representing, for example, the viewing start with a downward arrow and the viewing end with an upward arrow. In this case, the user can grasp clearly which part of the program the user already viewed. Furthermore, the user can visually appreciate the degree of time over which the user already viewed the program on the personal digital assistant 1, as compared with the whole of the program. Even if the viewing log information is displayed so as to be superposed on the time frame A202 with a color or shape being changed for a part between the viewing start and the viewing end, a similar effect can be obtained. By searching for a scene or head by using these kinds of display information, the user's operation can be simplified. In addition, by using the user's memory and the viewing log information displayed on the display apparatus 5, it becomes possible to search for and view unviewed scenes with higher certainty and efficiency.

The selection of a scene to be reproduced in the recording and reproduction apparatus 2 may also be conducted by direct operation on the main body of the recording and reproduction apparatus 2 or by using a remote controller. At this time, it is desirable for the control unit 24 to exercise control so as to display an operation guide A 205 on the display apparatus 5. The scene to be reproduced in the recording and reproduction apparatus 2 may also be selected by using the personal digital assistant 1.

FIG. 10 is a diagram showing a second embodiment of the present invention. In the first embodiment, a program recorded in the personal digital assistant 1 is previously stored in the recording and reproduction apparatus 2. However, it is conceivable that the program recorded in the personal digital assistant 1 is not stored in the recording and reproduction apparatus 2. In the present embodiment, the personal digital assistant 1 orders in such a case the recording and reproduction apparatus 2 to conduct video recording of the program.

FIG. 10 is a diagram showing a program video recording order issued to the recording and reproduction apparatus 2 by the personal digital assistant 1. First, upon detecting a viewing cutoff condition described below while the personal digital assistant 1 is receiving a TV broadcast, the control unit 16 extracts program information from a broadcast signal, which is being received via the broadcast reception unit 11, and transmits the extracted program information and a video recording ordering command for conducting video recording of the program to the recording and reproduction apparatus 2 (step 114). By the way, the above-described viewing cutoff condition is satisfied, for example, when the received radio wave strength in the broadcast reception unit 11 in the personal digital assistant 1 becomes less than an arbitrary threshold and consequently the control unit 16 judges that viewing has become impossible, when the residual quantity in the battery provided in the personal digital assistant 1 has lowered, or when the communication unit 12 has detected call incoming of a talking signal. It is also conceivable that the user's schedule is stored in the storage unit 15. In the case where viewing becomes difficult due to execution of the schedule, arrival of start time of the schedule or arrival of time that precedes the start time by a predetermined time may also be set as a viewing cutoff condition. Owing to such control, the user of the personal digital assistant 1 can transmit a video recording ordering command to the recording and reproduction apparatus 2 without conducting particular operation. Furthermore, if these viewing cutoff conditions and whether the video recording order is issued to the recording and reproduction apparatus 2 are made selectable according to the user's operation and stored in the storage unit 15, then the convenience is further improved.

The control unit 24 in the recording and reproduction apparatus 2 receives the video recording ordering command. On the basis of the received video recording ordering command and program information, the control unit 24 in the recording and reproduction apparatus 2 starts video recording of the pertinent program (step 115). On the basis of the program information, the control unit 24 in the recording and reproduction apparatus 2 conducts processing so as to automatically terminate the video recording when the program has finished. As a result, it becomes unnecessary for the user to order video recording termination.

By the way, upon starting the video recording, the recording and reproduction apparatus 2 may send a video recording setting signal of the program to the personal digital assistant 1 (step 116). Upon receiving the video recording setting signal, the personal digital assistant 1 displays contents of video recording setting of the pertinent program, such as the fact that video recording has been started, program information for which a video recording request has been issued, or how long recording can still be done, on the display unit 15 (step 117).

In this way, when program viewing is cutoff by the personal digital assistant 1, video recording can be set in the recording and reproduction apparatus 2 installed indoors. Therefore, it is possible to prevent inconvenience that video recording information is not present in the recording and reproduction apparatus 2 when the recording and reproduction apparatus 2 is requested by using the personal digital assistant 1 to reproduce a program. Furthermore, since the personal digital assistant 1 is notified of the contents of the video recording setting, it becomes unnecessary to be anxious as to whether video recording is being conducted properly. Furthermore, since a video recording order is issued to the recording and reproduction apparatus 2 by using program information recorded in the personal digital assistant 1 during reception, inputting for the video recording order can be omitted.

In an alternative configuration, the recording and reproduction apparatus 2 notifies the personal digital assistant 1 of the video recording setting signal of the program for which a video recording order has been issued, before starting the video recording. Upon receiving the video recording setting signal, the personal digital assistant 1 displays contents of the video recording setting of the pertinent program on the display unit 15 and prompts the user to select whether to conduct the video recording. In this case, the user can watch the contents of the video recording setting and select whether to conduct the video recording, before the video recording is started. For example, even if the user issued a video recording order, the user can reconsider and cancel the video recording, resulting in convenience in use.

Furthermore, in an alternative configuration, the user orders suspension of video recording via the personal digital assistant 1, and forcibly suspends the video recording operation in the recording and reproduction apparatus 2. Upon receiving a video recording suspension signal in this case, the control unit 24 forcibly terminates the video recording of the program.

As for the form of the video recording order, for example, video recording is conducted until a predetermined time elapses or a predetermined information content is obtained since the video recording order is issued, according to setting. Or the video recording may also be set in the form: from xx minutes past xx to xx minutes past xx.

FIG. 11 is a diagram showing a third embodiment of the present invention. In the second embodiment, the recording and reproduction apparatus 2 starts video recording from a video recording request moment (viewing cutoff condition satisfaction moment) during program viewing. Therefore, the recording and reproduction apparatus 2 cannot conduct video recording of the program from its beginning. In the present embodiment, a search is made to determine a rebroadcast of the program that is being viewed is present soon (for example, in one month). If a rebroadcast is present, video recording reservation of the rebroadcast is conducted.

As a result, the recording and reproduction apparatus 2 can conduct video recording of the program from its beginning.

FIG. 11 is a diagram showing a program video recording order issued to the recording and reproduction apparatus 2 by the personal digital assistant 1. In FIG. 11, processing of steps 112 to 115 is the same as the processing of steps 112 to 115 in FIG. 10.

Upon starting the video recording at the step 115, the control unit 24 in the recording and reproduction apparatus 2 makes a search to determine whether a rebroadcast is scheduled in the near future on the basis of program information (such as a program ID or a table of programs scheduled to be broadcasted soon) of the program for which a video recording request has been issued (step 118). As means by which the control unit 24 searches for rebroadcast information, it is possible to provide an external search server 8 for making a search to determine whether the rebroadcast is scheduled, transmit program information from the recording and reproduction apparatus 2 to the external search server 8, and receive a result of the search from the external search server 8. As a result, it is possible to reduce the processing burden on the recording and reproduction apparatus 2, save the power consumption, and acquire the result of fast search from the external server. Program information received from a broadcasting station or the like may also be used.

If there is a rebroadcast as a result of the search, then the control unit 24 sets a video recording reservation (step 120). If there is not a rebroadcast, then the control unit 24 does not set a video recording reservation (step 121).

Upon setting a video recording reservation, the recording and reproduction apparatus 2 sends a video recording setting signal and a rebroadcast video recording reservation signal of the set program to the personal digital assistant 1 (step 122). Upon receiving the video recording setting signal and the rebroadcast video recording reservation signal, the personal digital assistant 1 stores the video recording setting signal and a rebroadcast video recording reservation setting signal in the storage unit 15, and displays contents of the video recording setting signal and the rebroadcast video recording reservation signal on the display unit 15 (step 123).

If the rebroadcast is not present, then display to the effect is conducted. When reproducing a program obtained by video recording of a rebroadcast, the control unit 16 in the personal digital assistant 1 handles the rebroadcast video recording reservation signal stored in the storage unit 15 as program information, and transmits it to the recording and reproduction apparatus 2 as represented by the step 105 in FIG. 7. Upon receiving this signal (rebroadcast video recording reservation signal), the recording and reproduction apparatus 2 displays the video-recorded signal of the rebroadcast stored in the recording unit 23, on the display apparatus 5.

In this way, it is possible to search for a rebroadcast and make a video recording reservation with simple operation, and the user can view the program from its beginning.

By the way, before starting the video recording, the recording and reproduction apparatus 2 can send the video recording setting signal of the program to the personal digital assistant 1. With reference to contents of the video recording setting signal and rebroadcast video recording reservation signal displayed on the display unit 15 in the personal digital assistant 1, the user can select whether to conduct video recording immediately, make a rebroadcast video recording reservation, or not to conduct video recording. Heretofore, an example in which the recording and reproduction apparatus 2 searches for rebroadcast information has been described. However, the personal digital assistant 1 may search for rebroadcast information and transmit a result of the search to the recording and reproduction apparatus 2.

FIG. 12 is a diagram showing a fourth embodiment of the present invention. If a rebroadcast is video-recorded in the third embodiment, then video information (post-recording-request video information), which began to be recorded when the video recording ordering command was received from the personal digital assistant 1 at the step 114, and video information (rebroadcast video information) obtained by video recording of the rebroadcast at the step 120 are present in the recording and reproduction apparatus 2. In this case, the program information acquired by the user in the video recording request (step 114) is information concerning the post-recording-request video information, and it is not information concerning the rebroadcast video information. Therefore, the user cannot view a broadcast by using program information acquired in the video recording request (step 114).

FIG. 12 is a diagram showing processing of storing the video recording setting signal (personal digital assistant side program information) transmitted from the personal digital assistant 1 and rebroadcast information so as to associate them with each other. First, if there is a rebroadcast as a result of the search for the rebroadcast program at the step 118, then the control unit 24 sets a video recording reservation (step 120). Subsequently, the control unit 24 sets so as to store the video recording setting signal transmitted from the personal digital assistant 1 and rebroadcast information while associating them with each other (step 124). On the other hand, if there is not a rebroadcast, then the control unit 24 does not make a video recording reservation (step 121) and sets so as to store only the video recording setting signal transmitted from the personal digital assistant 1 (step 125).

In the case where the post-recording-request video information and the rebroadcast video information are recorded in the recording and reproduction apparatus 2, therefore, the video recording setting signal and the rebroadcast information are stored so as to be associated with each other. When an order for reproducing the post-recording-request video information is transmitted from the personal digital assistant 1, therefore, the recording and reproduction apparatus 2 can search for the rebroadcast video information and display it on the display apparatus 5. As a result, the user can easily reproduce the rebroadcast video information by using the program information stored at the time of video recording request.

Furthermore, it is also possible to select and reproduce the post-recording-request video information or the rebroadcast video information. In such a configuration, the user can select whether to view the program from a continuation of the scene for which video recording was requested or view the rebroadcast from its beginning. Except the steps 124 and 125, steps shown in FIG. 12 are the same as those shown in FIG. 11, and consequently description of them will be omitted.

FIG. 13 is a diagram showing a fifth embodiment of the present invention. In the second, third and fourth embodiments, a program video recording order is issued to the recording and reproduction apparatus 2 when the control unit 16 in the personal digital assistant 1 has detected a viewing cutoff condition. However, various utilization formats of the personal digital assistant 1 are conceivable. For example, if viewing is started in the middle of a program as shown in FIG. 6(*b*), a program view-recording order cannot be issued to the recording and reproduction apparatus 2 in the prescribed embodiments.

In the present embodiment, a program view-recording order can be issued when viewing is started. First, if the user operates the personal digital assistant 1 and starts broadcast reception, the control unit 16 extracts program information from a broadcast signal that is being received by the broadcast reception unit 11, and transmits the extracted program information and a video recording ordering command for conducting video recording of the program to the recording and reproduction apparatus 2 (step 114). Subsequent processing is the same as that in the second embodiment (FIG. 10), and consequently its description will be omitted.

By the way, in the case where a search for a rebroadcast is made, it can be implemented by making the processing subsequent to the step 115 the same as that in FIG. 11 or 12. Owing to such control, the user can transmit the video recording ordering command to the recording and reproduction apparatus 2 without conducting particular operation. Furthermore, if whether to issue the video recording order is made selectable according to the user's operation on the operation unit 14 in the personal digital assistant 1 and a result of the selection is stored in the storage unit 15, then the convenience in use according to the use situation and the user's taste is improved.

Figure 14:
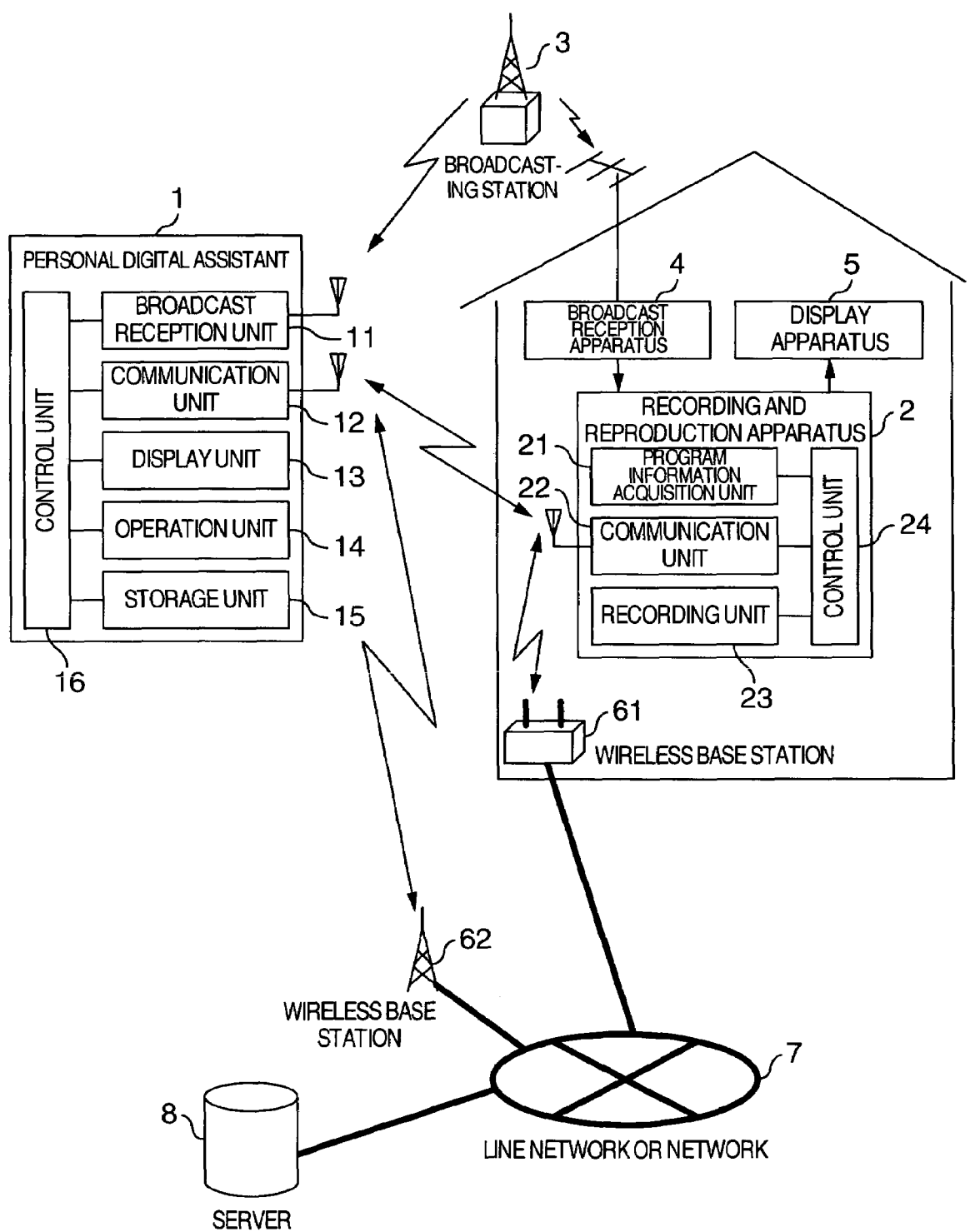
FIG. 14 is a diagram showing a sixth embodiment of the present invention.

FIG. 14 is a diagram showing a sixth embodiment of the present invention, and it is a diagram showing a configuration example of a recording and reproduction system. In this example, the communication units 12 and 22 respectively included in the portable digital assistant 1 and the recording and reproduction apparatus 2 can establish a communication link via an external line network or a network. For example, if the communication transmission path is the above described second generation small power data communication system/wireless LAN system, the wireless base stations 61 and 62 called access points are installed outdoors or indoors, and they can be connected to each other via an external network (Internet).

When the personal digital assistant 1 and the recording and reproduction apparatus 2 are indoors, they can communicate directly. If the user carries out the personal digital assistant 1 to the outdoors, then they can communicate with each other via the external network. Therefore, it is effective in the case where the personal digital assistant 1 issues a video recording request to the recording and reproduction apparatus 2. Furthermore, since it also becomes possible to access the external server 8 and acquire program relating information other than information that can be extracted from a broadcast signal, the user's convenience is improved.

Figure 15:
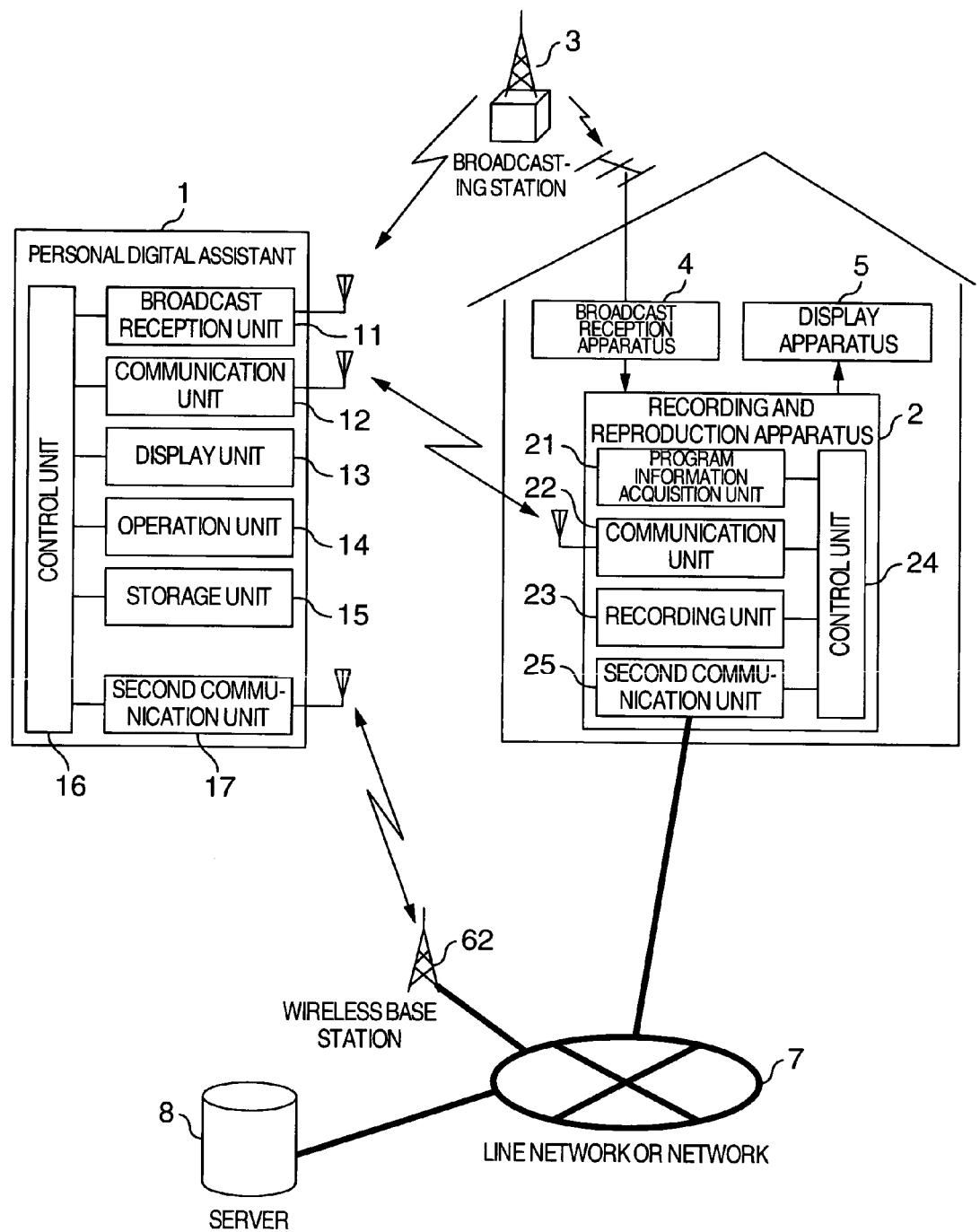
FIG. 15 is a diagram showing a seventh embodiment of the present invention.

FIG. 15 is a diagram showing a seventh embodiment of the present invention, and it is a diagram showing another configuration example of a recording and reproduction system. In this example, second communication units 17 and 25 are provided in the personal digital assistant 1 and the recording and reproduction apparatus 2, respectively. Unlike the sixth embodiment (FIG. 14), the communication units 12 and 22 are used when the personal digital assistant 1 and the recording and reproduction apparatus 2 conduct direct communication, whereas the second communication units 17 and 25 are used when the personal digital assistant 1 and the recording and reproduction apparatus 2 conduct direct communication via the external network 7. This example is also effective to the case where the personal digital assistant 1 issues a video recording request to the recording and reproduction apparatus 2. Furthermore, since it also becomes possible to access the external server 8 and acquire program relating information other than information that can be extracted from a broadcast signal, the user's convenience is improved.

Figure 16:
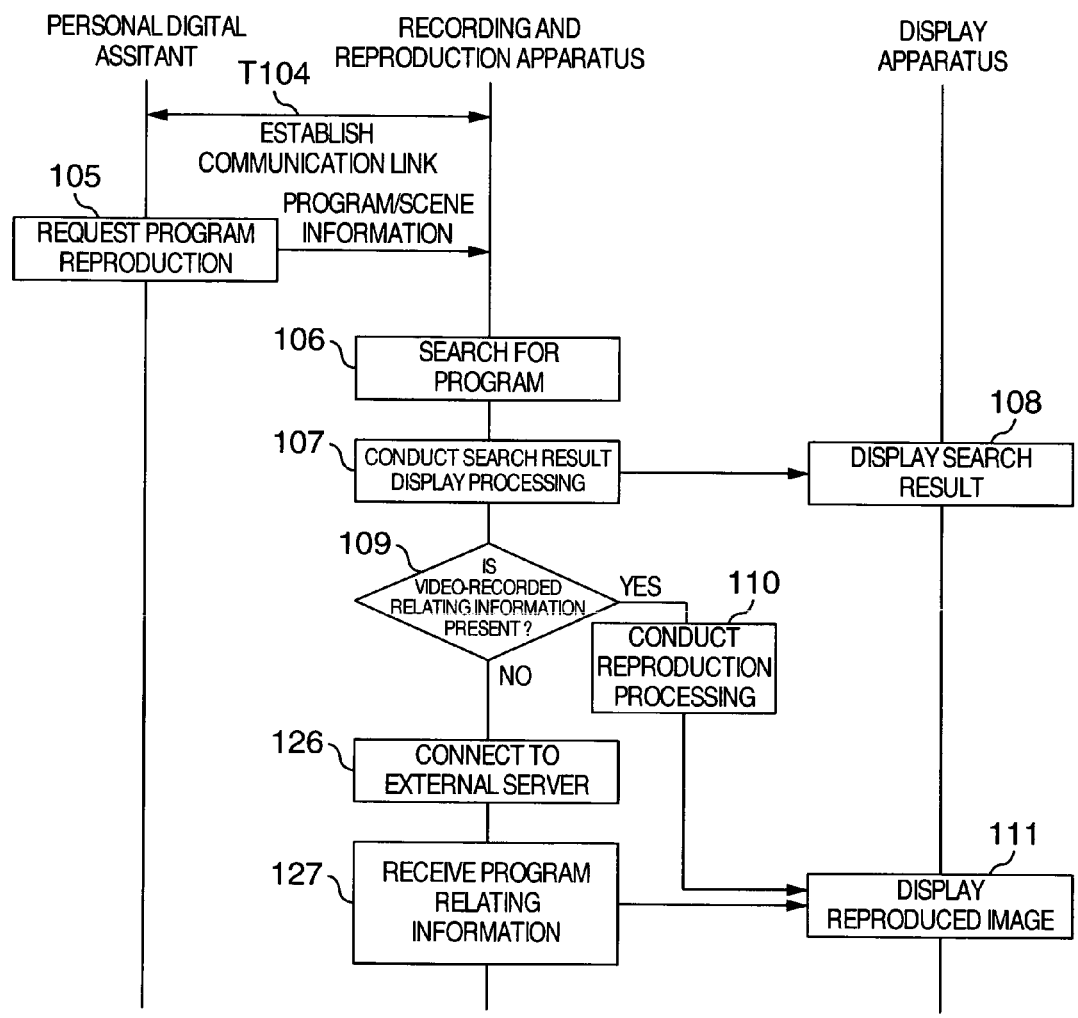
FIG. 16 is a diagram showing an eighth embodiment of the present invention.

FIG. 16 is a diagram showing an eighth embodiment of the present invention, and it is a diagram showing processing of reproducing a program recorded in the recording and reproduction apparatus. Processing conducted in the case where a video-recorded record is not present when a reproduction request is issued from the personal digital assistant 1 to the recording and reproduction apparatus 2 in the first embodiment (FIG. 7) will now be described.

If video-recorded relating information is found as a result of the search at the step 106, the recording and reproduction apparatus 2 conducts processing so as to reproduce the obtained video-recorded information (steps 110 and 111). If it is found that video-recorded information is not present as a result of the search, then the recording and reproduction apparatus 2 connects itself to the external server 8 shown in FIG. 14 or 15, and requests the external server 8 to acquire program relating information of a program for which a reproduction request has been issued (step 126). Upon receiving the acquisition request, the external server 8 searches for program relating information and transmits a result of the search to the recording and reproduction apparatus 2 (step 127). By the way, the program relating information may also be broadcast content recording data, rebroadcast information of the program, program introduction home page, information of performers in the program, and outline of the program. Upon acquiring the program relating information from the external server 8, the recording and reproduction apparatus 2 temporarily stores the program relating information in the storage unit 23 and then reproduces it on the display apparatus 5.

Since the user can acquire various kinds of program relating information from the server 8 without conducting search operation by using the recording and reproduction apparatus 2, the convenience in use is favorable. By the way, the recording and reproduction apparatus 2 may conduct the reproduction in such a streaming form as to successively display a reproduced view on the display apparatus 5 while receiving broadcast content recording data from the server 8. In the present embodiment, it is possible to acquire various kinds of program relating information from the external server 8 and display it according to a reproduction request from the personal digital assistant 1, even if video-recorded information is not stored in the recording and reproduction apparatus 2.

Figure 17:
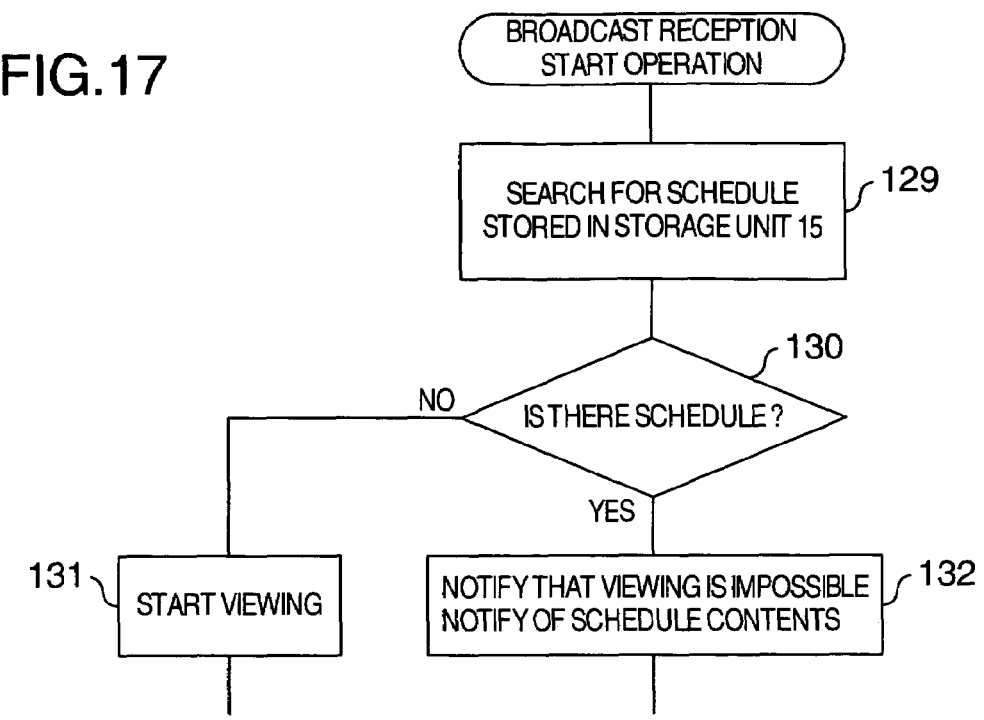
FIG. 17 is a diagram showing a ninth embodiment of the present invention.

FIG. 17 is a diagram showing a ninth embodiment of the present invention, and it is a diagram showing processing of limiting TV broadcast viewing according to the user's schedule.

The user's schedule information is stored in the storage unit 15 in the personal digital assistant 1 by operation on the operation unit 14. By the way, this schedule information may be transferred from an external device, which is not illustrated, via the communication unit 12 and stored in the storage unit 15.

If viewing is started, then the control unit 16 searches for a schedule stored in the storage unit 15 (step 129). The schedule search subject interval can be set in, for example, an arbitrary time interval with respect to the current time. If the control unit 16 has judged that there is a schedule as a result of the search, then the control unit 16 displays that the TV broadcast viewing is impossible, by using the display unit 13. If schedule contents are displayed at this time, then the user can easily understand the reason why the viewing is impossible and it is possible to remind the user of the schedule. As for the notice that viewing is impossible, means such as voice, vibration and light may also be used besides the notice using the display unit 13. The user may select a notice method suitable for the place of use.

On the other hand, if the control unit 16 has judged that there is not a schedule, then the control unit 16 displays broadcast contents supplied from the broadcast reception unit 11 on the display unit 13. Owing to the processing heretofore described, it is possible to prevent the user from forgetting a schedule and starting the viewing.

Figure 18:
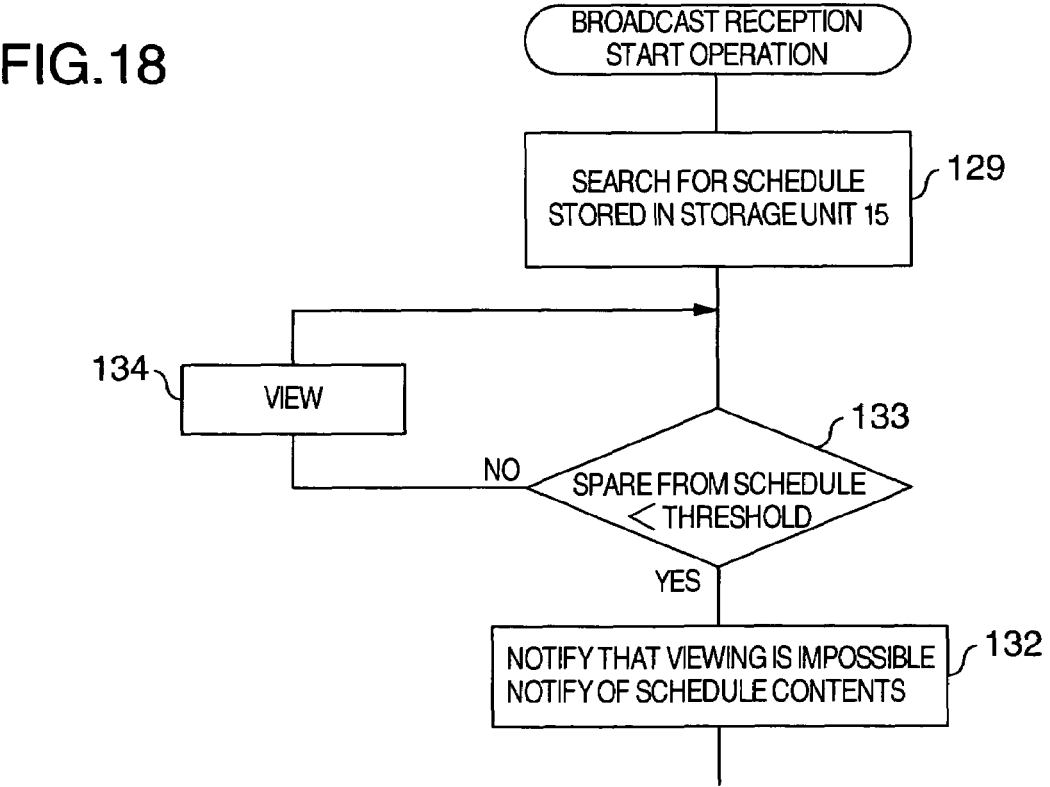
FIG. 18 is a diagram showing a tenth embodiment of the present invention.

FIG. 18 is a diagram showing a tenth embodiment of the present invention, and it is a diagram showing another example of processing of limiting TV broadcast viewing according to the user's schedule.

If viewing is started, then the control unit 16 searches for a schedule stored in the storage unit 15 (step 129). The schedule search subject interval needs only, for example, cover a schedule nearest the current time. The control unit 16 compares the search result with the current time, and permits viewing until time between the current time and a schedule (spare time) becomes a predetermined value or less (steps 133 and 134). If the spare time has become the predetermined value or less, then display to the effect that viewing is impossible is conducted on the display unit 13. If schedule contents are displayed when conducting display to the effect that viewing is impossible, then the user can easily understand the reason why the viewing is impossible and it is possible to remind the user of the schedule. Furthermore, it is possible to prevent viewing from being interrupted because of the next schedule soon after the viewing is started, resulting in improved convenience in use.

Figure 19A:
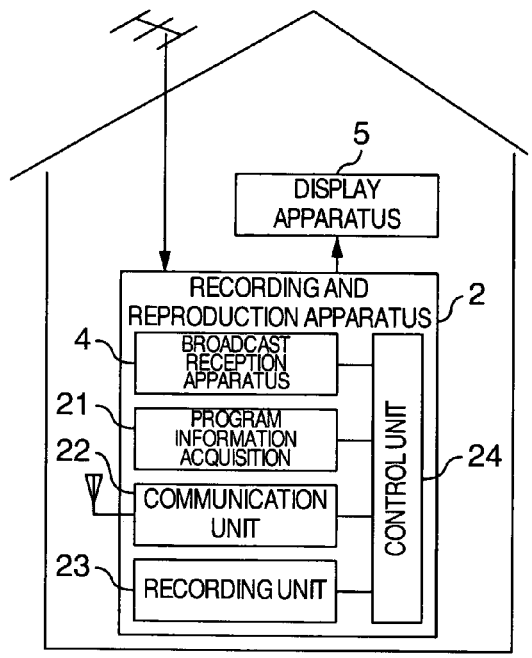
FIGS. 19A, 19B and 19C are diagrams showing other examples of a configuration of a recording and reproduction apparatus.
Figure 19B:
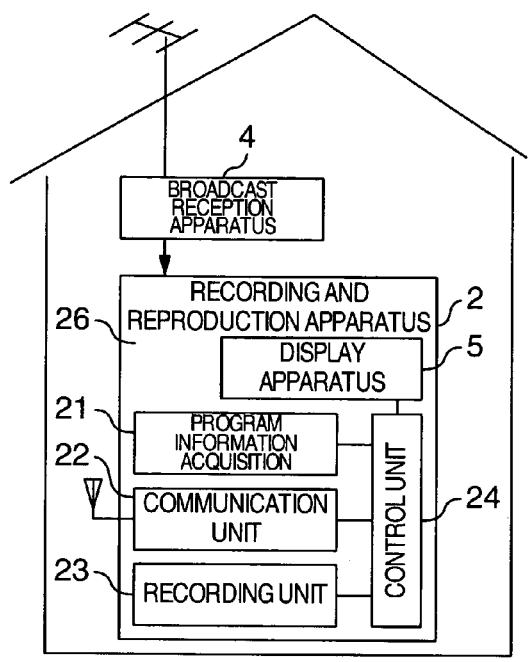
Figure 19C:
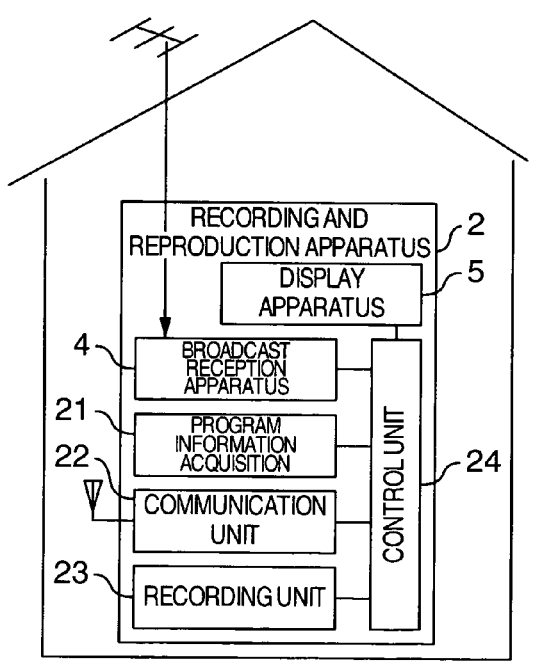

FIGS. 19A, 19B and 19C are diagrams showing other configuration examples of the recording and reproduction apparatus. Heretofore, an example in which the broadcast reception apparatus 4 or the display apparatus 5 is provided outside the recording and reproduction apparatus 2 has been described. However, this configuration is not restrictive. For example, the broadcast reception apparatus 4 or the display apparatus 5 may be provided within the recording and reproduction apparatus 2 respectively as shown in FIG. 19A or 19B. Both the broadcast reception apparatus 4 and the display apparatus 5 may be provided within the recording and reproduction apparatus 2 as shown in FIG. 19C.

A broadcast signal is broadcasted in some cases with limiting information for limiting reproduction or duplication of video information added to the data format shown in FIG. 2 (charged broadcast). In such a case as well, the video information can be duplicated or reproduced by using the above-described account card or the like. By the way, the limiting information may be, for example, information for completely prohibiting reproduction or duplication of contents such as video information, information for permitting reproduction or duplication only a predetermined number of times or only for a predetermined time, or information for prohibiting transmission of the contents attached to mail.

By the way, when canceling the limiting information for limiting the reproduction or duplication, an account information reading unit for reading account information stored in an account card is provided in the broadcast reception apparatus or the recording and reproducing apparatus. This reading unit has a slot for inserting, for example, an account card. When canceling the limiting information and receiving contents, an account card or the like is inserted in the slot for account card, and the broadcast signal is deciphered and accounting is conducted on the basis of information stored on the card. In the case where an account information reading unit for reading account information stored on an account card is thus provided in the broadcast reception apparatus or the recording and reception apparatus, it is possible to cancel the limiting information and conduct duplication or reproduction even if an account card is not inserted in the personal digital assistant.

According to the present embodiment, the situation of viewing conducted by using the personal digital assistant can be reflected in the recording and reproduction apparatus as heretofore described. As a result, it is possible to provide a personal digital assistant apparatus and a recording and reproduction apparatus improved in convenience in use. Furthermore, it is possible to share viewing information when viewing a personal digital assistant, an indoor TV receiver, and a recording and reproduction apparatus. As a result, convenience in use of a broadcast recording and reproduction system can be improved.

Furthermore, by controlling whether viewing is possible according to the schedule of the user of the personal digital assistant, it is possible to prevent the user of personal digital assistant 1 from forgetting a schedule and starting viewing. In addition, it is possible to prevent viewing from being discontinued by the next schedule soon after the start of the viewing and prevent viewing from being continued by forgetting a schedule.

Furthermore, since the personal digital assistant 1 and the recording and reproduction apparatus 2 can be operated by using only one terminal (personal digital assistant 1), operation performance is improved. In addition, operation (such as video recording order) for the recording and reproduction apparatus 2 can be conducted remotely. Furthermore, since the recording and reproduction apparatus 2 can search for, for example, a rebroadcast program and record it, the operation performance is improved.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A portable information terminal apparatus comprising:
   a reception unit for receiving a broadcast signal including program information;
   a communication unit for conducting communication with a recording and reproduction apparatus, the recording and reproduction apparatus recording and reproducing a broadcast signal;
   a display unit for displaying the program information and video information included in the broadcast signal;
   a storage unit for storing a viewing history of a received and displayed video signal; and
   an operation unit for operating viewing in the portable information terminal apparatus,
   wherein on the basis of the viewing history stored in said storage unit, the portable information terminal apparatus sends an order signal to the recording and reproduction apparatus via said communication unit to order recording or reproduction of information relating to the viewing history.

2. The portable information terminal apparatus according to claim 1, wherein said communication unit conducts communication with the recording and reproduction apparatus via a network.

3. The portable information terminal apparatus according to claim 1, wherein when a viewing cutoff condition of a broadcast signal is satisfied, the portable information terminal apparatus sends out an order signal to the recording and reproduction apparatus on the basis of program information of a program that is now being viewed, in order to cause the recording and reproduction apparatus to start recording of the program.

4. The portable information terminal apparatus according to claim 1, wherein when a viewing cutoff condition of a broadcast signal is satisfied, rebroadcast information of a program that is now being viewed is searched for on the basis of program information of the program, and a reservation order signal for reserving video recording is sent out on the basis of the rebroadcast information obtained by the search.

5. The portable information terminal apparatus according to claim 1, wherein when a viewing cutoff condition of a broadcast signal is satisfied,
   an order signal is sent out to the recording and reproduction apparatus on the basis of program information of a program that is now being viewed, in order to cause the recording and reproduction apparatus to start recording of the program, and
   the recording and reproduction apparatus searches for rebroadcast information of the program, generates a reservation signal for reserving video recording on the basis of the rebroadcast information obtained by the search in order to reserve video recording, and stores the program information of the program that is now being viewed in said storage unit so as to associate the program information with the rebroadcast information.

6. The portable information terminal apparatus according to claim 1, wherein when starting viewing with the portable information terminal apparatus, a video recording order signal is sent out to the recording and reproduction apparatus.

7. The portable information terminal apparatus according to claim 1, wherein
   said storage unit stores user's schedule information, and
   when the stored schedule information does not match a broadcast signal reception schedule input by the user, information to the effect that viewing is impossible is displayed.

8. The portable information terminal apparatus according to claim 1, wherein
   said storage unit stores user's schedule information, and
   when spare time between the stored schedule and a broadcast signal reception schedule input by the user is shorter than a preset value, information to the effect that viewing time is insufficient is displayed.

9. The portable information terminal apparatus according to claim 1, wherein the portable information terminal apparatus conducts communication with the recording and reproduction apparatus via a telephone line network.

10. A recording and reproduction apparatus comprising:
    a recording and reproduction unit for recording and reproducing a broadcast signal;
    a communication unit for conducting communication with a portable information terminal apparatus, the portable information terminal apparatus including an operation unit for operating said recording and reproduction unit; and
    program information acquisition unit for acquiring program information included in the program signal,
    wherein on the basis of viewing history information of the portable information terminal apparatus itself received from the portable information terminal apparatus, a record of information relating to the viewing history is searched for, and the record obtained by the search is reproduced.

11. The recording and reproduction apparatus according to claim 10, wherein the information relating to the viewing history is broadcast content recording data or rebroadcast content recording data.

12. The recording and reproduction apparatus according to claim 10, wherein when broadcast content recording data or rebroadcast content recording data cannot be obtained as the information relating to the viewing history by the search, broadcast content recording data or rebroadcast content recording data is acquired from an external server and displayed.

13. A recording and reproduction system comprising:
a portable information terminal apparatus including a reception unit for receiving a broadcast signal including program information, a communication unit for conducting communication with a recording and reproduction apparatus, the recording and reproduction apparatus recording and reproducing a broadcast signal, a display unit for displaying the program information and video information included in the broadcast signal, a storage unit for storing a viewing history of a received and displayed video signal, and an operation unit for operating viewing in the portable information terminal apparatus; and
the recording and reproduction apparatus connected to said portable information terminal apparatus via said communication unit,
wherein on the basis of a viewing history stored in the storage unit, the portable information terminal apparatus orders the recording and reproduction apparatus via the communication unit to reproduce information relating to the viewing history from among information stored in the recording and reproduction apparatus.

14. The recording and reproduction system according to claim 13, wherein when a viewing cutoff condition of a broadcast signal is satisfied in the portable information terminal apparatus, the portable information terminal apparatus sends out an order signal to the recording and reproduction apparatus on the basis of program information of a program that is now being viewed, in order to cause the recording and reproduction apparatus to start recording of the program.

15. The recording and reproduction system according to claim 13, wherein when a viewing cutoff condition of a broadcast signal is satisfied in the personal digital assistant apparatus, rebroadcast information of a program that is now being viewed is searched for on the basis of program information of the program, and a reservation order signal for reserving video recording is sent to the recording and reproduction apparatus on the basis of the rebroadcast information obtained by the search.

16. The portable information terminal apparatus according to claim 1, further comprising an account information reading unit for reading account information with respect to a charged broad cast.

17. The recording and reproduction system according to claim 13, wherein
the portable information terminal apparatus comprises an account information reading unit for reading account information with respect to a charged broad cast, and
the recording and reproduction apparatus reproduces received information on the basis of the account information read by said reading unit.

* * * * *